(12) United States Patent
Hwang

(10) Patent No.: US 6,216,220 B1
(45) Date of Patent: Apr. 10, 2001

(54) MULTITHREADED DATA PROCESSING METHOD WITH LONG LATENCY SUBINSTRUCTIONS

(75) Inventor: Myeong Eun Hwang, Seoul (KR)

(73) Assignee: Hyundai Electronics Industries Co., Ltd., Seoul (KR)

( * ) Notice: Subject to any disclaimer, the term of this patent is extended or adjusted under 35 U.S.C. 154(b) by 0 days.

(21) Appl. No.: 09/168,068

(22) Filed: Oct. 8, 1998

(30) Foreign Application Priority Data

Apr. 8, 1998 (KR) .................................................. 98/12337

(51) Int. Cl.$^7$ ...................................................... G06F 15/00
(52) U.S. Cl. .............................. 712/219; 712/23; 712/24; 709/103; 709/108
(58) Field of Search ............................... 709/103, 107, 709/108, 105, 102; 712/24, 200, 206, 212, 215, 216, 228, 229, 23, 219, 226; 714/47, 35, 139

(56) References Cited

U.S. PATENT DOCUMENTS

| | | | | |
|---|---|---|---|---|
| 5,297,274 | * | 3/1994 | Jackson .................................. | 703/22 |
| 5,574,939 | * | 11/1996 | Keckler et al. ......................... | 712/24 |
| 5,627,982 | * | 5/1997 | Hirata et al. ........................... | 712/206 |
| 5,799,188 | * | 8/1998 | Manikundalam et al. ........... | 709/108 |
| 5,835,705 | * | 11/1998 | Larsen et al. ........................... | 714/47 |
| 6,018,759 | * | 1/2000 | Doing et al. .......................... | 709/108 |
| 6,061,710 | * | 5/2000 | Eickemeyer et al. ................. | 709/107 |
| 6,073,159 | * | 6/2000 | Emer et al. ............................ | 709/103 |

\* cited by examiner

*Primary Examiner*—John A. Follansbee
(74) *Attorney, Agent, or Firm*—Fleshner & Kim, LLP

(57) ABSTRACT

The data processing system, a combination of multithreaded architecture and a VLIW (Very Long Instruction Word) processor is adapted to process plural threads. The system uses multiple program counters for context-switching only a subinstruction which causes a long latency. A method is provided for processing instructions in a data processing system having an active thread block, a ready thread block and a waiting thread block, and a instruction execution block, for processing a plurality of threads. The method includes combining instructions issued from the respective active threads into one new instruction, each active thread having a plurality of instructions, and the issued instructions being used as subinstructions in the combined one instruction. The combined instruction as processed by the instruction execution block, while tracing contexts relating to the threads which provide the respective subinstructions by using multiple program counters. Context-switching occurs only for the context of the thread which provides a long latency subinstruction among the subinstructions to be executed, the context switching being performed by the program counter tracing the context and involving moving the thread to the waiting thread block, and then combining instructions from another thread in the ready thread block into another new instruction to be processed by the instruction execution block.

8 Claims, 4 Drawing Sheets

MULTITHREADED DATA PROCESSING METHOD WITH LONG LATENCY SUBINSTRUCTIONS

BACKGROUND OF THE INVENTION

1. Field of the Invention

The present invention relates to a data processing system, and more particularly to a multithreaded data processing system and an operating method thereof for processing a plurality of threads.

2. Description of the Conventional Art

Generally, plural instructions in a computer system are executed in sequence. An improvement in the processing time of the instructions can be achieved through the use of a cache memory providing a significant reduction in latency which means the time span between the start and the completion of an instruction's execution. Such a cache memory serve to reduce tens of cycles to a few cycles in the case of a memory reference operation.

In a single thread processor, the current state of a computation is defined by the contents of program counter, general-purpose registers, and status registers of the data processing system, etc., wherein the term "thread" means statically ordered sequences or instructions. Typically, a machine state of thread-related program counter and registers, including the above-mentioned elements provided in such a data processing system, are referred to as a hardware context. When the computation is interrupted in the above-described single thread processor, that is, when there occurs a waiting mode in which the processor must wait until a predetermined resource becomes available, the related context should be stored in a memory, so that resumption is possible at the moment when the computation is resumed.

Such a procedure may be referred to as a context switch, i.e., the act of redirecting processor execution from one context to another. That is, execution of one thread stops, to permit starting or resuming another thread's execution. Accordingly, the context should be saved in a memory and restored from the memory if required. However, such a context switch incurs context-switching overhead.

In order to decrease or eliminate such a context-switching overhead, a multithreaded architecture may be employed to obtain a parallel processing of a plurality of threads, thereby reducing a necessary instruction processing time period. Accordingly, depending on a design of the multithreaded architecture, this enables a workstation or a personal computer to effectively cope with its general task amount.

Specifically, an improvement in data processing speed is obtained by providing a plurality of general-purpose registers, status registers and program counter while using a multithreaded processor architecture, so that a plurality of thread contexts can be simultaneously stored in a given hardware. Therefore, during a context switching, it is not required to store the contents of registers into a memory and to retrieve the stored contents later. As a result, the processor becomes freed from the procedures that incur a long latency. However, a costly hardware is in return required, and so is a compromise.

Support for more than one context affects the performance of a processor, as well as the cost of its hardware. Increased costs stem from the replication of registers and other state circuitry for each context. If an access to register files is on the processor critical path, the cycle time could be increased due to the larger number of registers on multithreaded units.

For the most part, an architectural decision about how many contexts to support is based on the hardware budget, cycle time considerations, and expectations of run length and latency.

A computer system as a data processing apparatus is based on a CPU (Central Processing Unit) or processor that is used for recognizing and processing instructions given, and it is applied to a variety of industrial fields. Although such a processor is capable of recognizing a considerable number of instructions, the system speed experiences a retardation due to sparsely used instruction. Therefore, in order to prevent the speed retardation, complicated and long instructions may be advantageously replaced by combinations of more frequently employed short instructions. Consequently, a new design technique has been introduced, wherein respective instructions are set identical in size and multiple instructions are concurrently executed. A conventional data processing system having a so-called superscalar architecture for simultaneously processing a plurality of instructions will now be described.

A main trend of computer design under the above-mentioned circumstances is concerned with a superscalar processor which is able to provide and issue more than two subinstructions within a single cycle. Respective subinstructions are processed by each of multiple functional units in the processor for processing a plurality of threads.

The use of superscalar and multithreaded architectures provides a processor coupling. A plurality of subinstructions may be concurrently issued from several threads within a single cycle under the processor coupling.

FIG. 1 illustrates the processing of multiple threads in s conventional multithreaded architecture. As shown therein, there are provided, for example, three threads T1, T2, T3, each of which designates some of eight functional units f1–f8 in a processor which are to be used during, for example, five consecutive cycles. Here, reference numeral letter E denotes respective execution of functional units f1–f8 during the respective cycles in a vertical direction in the drawing. The respective functional units f1–f8 in the processor are mapped from different threads, and this clearly explains a processor coupling.

When more than two threads need to get access to identical functional units, one of the threads must wait until the corresponding functional unit completes its processing of the other thread.

In cycle 1 in FIG. 1, the first thread T1 is allocated to the third and fourth functional units f3, f4. In cycle 2, the first and second functional units f1, f2, which the first thread T1 also requires, are allocated for the third thread T3, so that the first and second functional units f1, f2 for the first thread T1 are assigned to the subsequent cycles 3, 4, respectively. Accordingly, a plurality of threads can be simultaneously processed within a certain number of cycles.

Such an architecture provides an interleaving as well as a thread switching as described below. In case a thread includes instructions with long latency, if there are no instructions to be issued due to the holding of such long latency instructions, instructions from other threads are automatically sent to functional units. In fact, a threads are switching may be understood as a subcategory of the interleaving. Further details as to FIG. 1 are described in S. Keckler and W. Dally, 19th International Symposium on Computer Architecture, 1992.

Next, a VLIW (Very Long Instruction Word) processor for processing a plurality of threads will now be explained.

The VLIW processor provides a parallel processing of instructions to reduce the number of instructions, wherein an instruction specifies more than one subinstructions.

FIG. 2 illustrates an instruction timing in a VLIW processor. As shown therein, a plurality of instructions are simultaneously processed. Here, reference characters i0, i1, i2 respectively denote serial instruction stream, f denotes a fetch stage, d is an instruction decoding stage, and e is an instruction execution stage. More details related to VLIW can be found in "Superscalar Microprocessor Design" by Mike Johnson, Prentice Hall, 1991.

As described above, a context switching occurs in a multithreaded processor architecture. In particular, a context switching overhead causing a performance deterioration of a system tends to be more problematic with a long latency instruction when a multithreaded architecture is coupled to a VLIW or superscalar processor.

SUMMARY OF THE INVENTION

Accordingly, the present invention is directed to solve the conventional disadvantages of the conventional multi-threaded system architecture.

It is an object of the present invention to provide multi-threaded processing system combined with a VLIW or superscalar architecture which system decreases the average number of cycles per instruction while effectively carrying out a simultaneous execution of instructions, thereby decreasing the clock cycles per instruction to the level of VLIW or superscalar architecture.

It is noted that the term of "subinstruction" has the same meaning of the term of "operation".

It is another object of the present invention to provide a multithreaded processing method using a processor for executing a plurality of threads.

To achieve the above-described objects, there is provided a method for processing instructions of a data processing system having active thread block, ready thread block and waiting thread block, and instruction execution means, so as to a plurality of threads, the method comprising the step of: combining instructions issued from the respective active threads into one new instruction group, the active thread having the plurality of instructions, and the issued instructions being used as subinstructions in the combined one instruction group; the combined instruction group being processed by the instruction execution block, and tracing contexts relating to threads which provide the respective subinstruction by using multiple program counters; and context-switching only the context of the thread which provides a long latency subinstruction among the subinstructions to be executed, the context switching being performed by the program counter tracing said context comprising moving the thread to the waiting thread block, and then combining instructions from another thread in the read thread block into another new instruction group to be processed by the instruction execution means.

According to the present invention, there is further provided a data processing system for processing a plurality of thread, and having active thread block, ready thread block and waiting thread block, and instruction execution means, the system comprising: memory means for loading the plurality of active threads therein; instruction combining means for combining instruction issued from the respective active threads into one new instruction, and the issued instructions being used as subinstructions in the combined one instruction; the combined instruction being processed by the instruction execution block, and a plurality of program counters for tracing contexts relating to threads which provide the respective subinstructions by using multiple program counters; and the context comprising contents of the program counters and a processor status, and another memory means for storing the threads, wherein only the context of the thread which provides a long latency subinstruction among the subinstructions to be executed is context-switched; wherein the context switching is performed by the program counter tracing said context comprising moving the thread to the waiting thread block; wherein then instructions from another thread in the thread block are combined into another new instruction to be processed by the instruction execution means.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE INVENTION

A VLIW and multithreaded architecture according to the preferred embodiment of the present invention will now be described with reference to the accompanying drawings.

Figure 1:
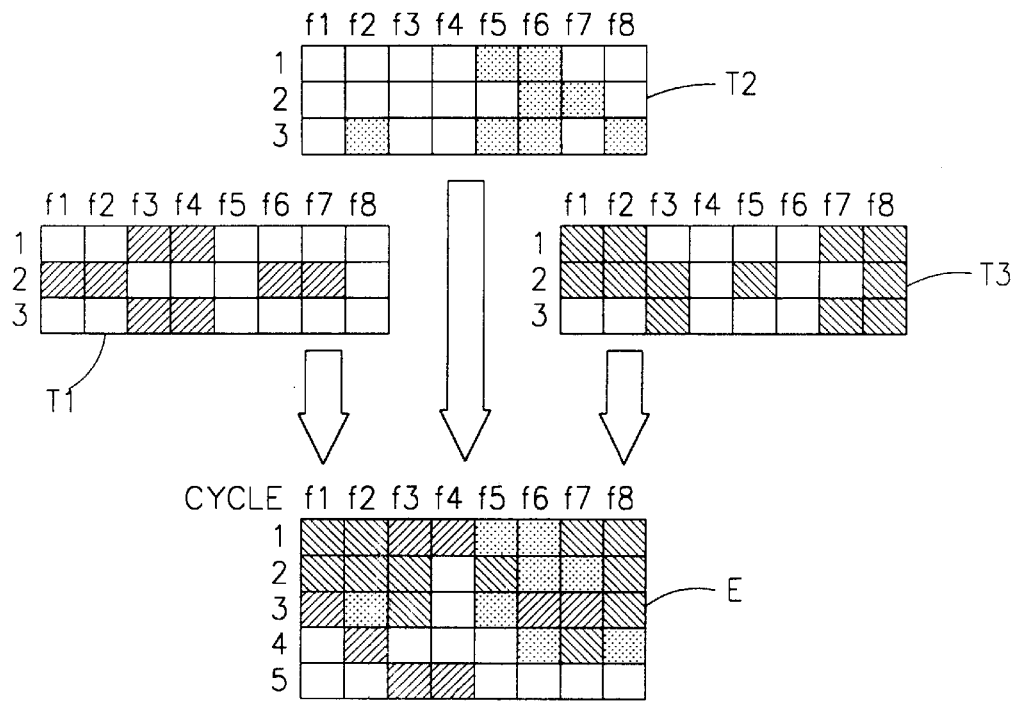
FIG. 1 is an exemplary view of the execution of multiple threads in a conventional mulithreaded processing architecture.
Figure 2:
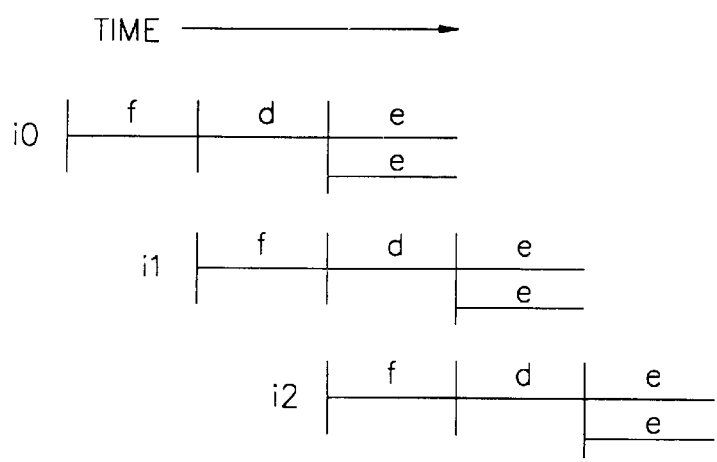
FIG. 2 is a timing diagram with regard to instructions in a VLIW processor according to the conventional art.
Figure 3:
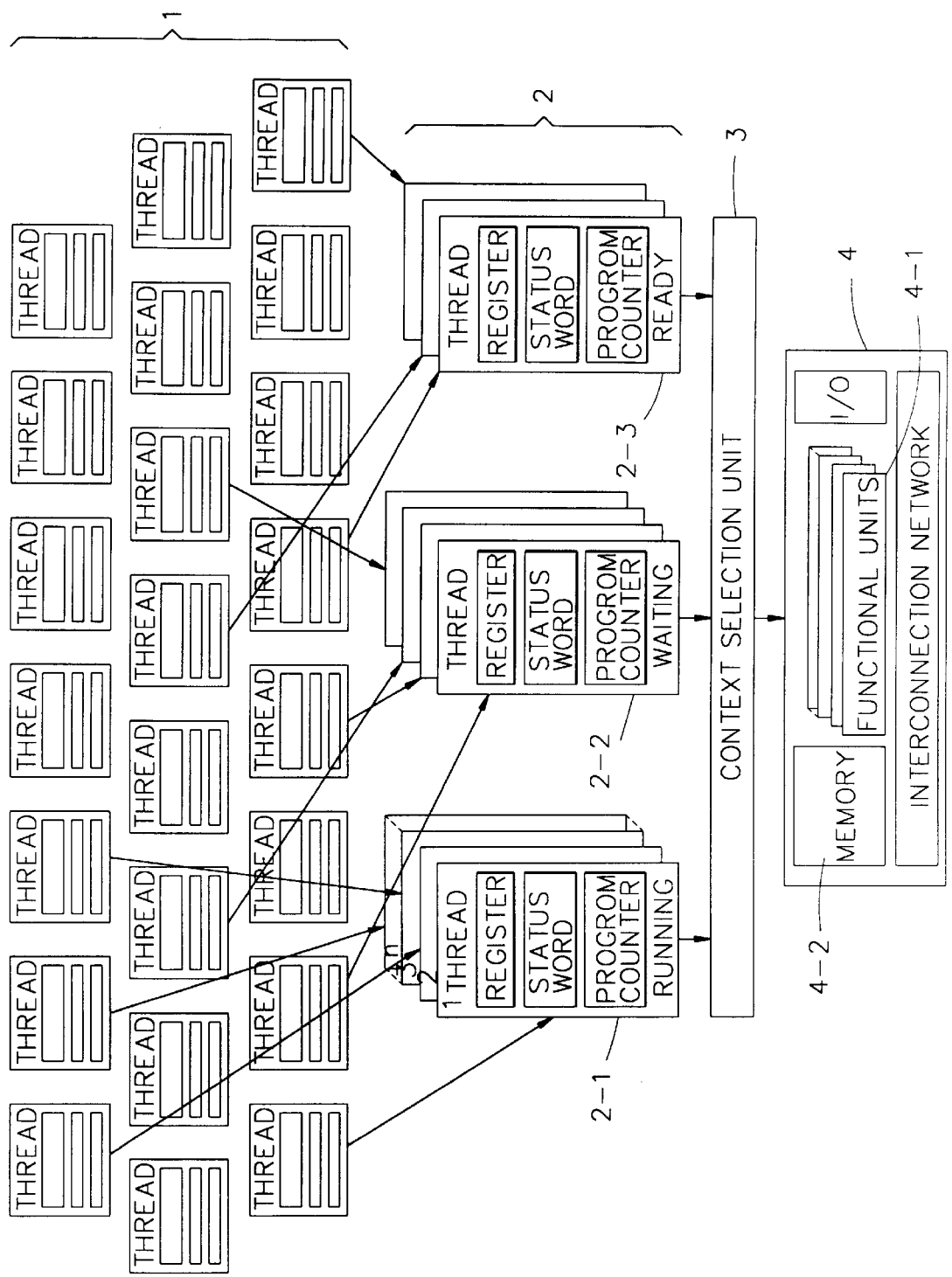
FIG. 3 is a block diagram illustrating a multithreaded architecture employing a VLIW according to the present invention.

FIG. 3 is a block diagram illustrating the multithreaded processing architecture employing a VLIW processor according to the present invention.

As shown therein, there are provided a plurality of thread blocks 1, hardware context blocks 2, a context selection unit 3, an instruction processing unit 4 including a plurality k of functional units 4-1. The 22 threads illustrated in FIG. 3 are provided as an example only, and the number of possible threads is not practically limited in the present invention.

The hardware context block 2 includes a running thread block 2-1, a waiting thread block 2-2 and a ready thread block 2-3, each of which has a set of data registers, status registers, and a program counter. They are used to hold, respectively, the contexts of specific threads in respective blocks.

Preferably, context switching between the threads is made on a cycle by cycle basis. To this end, it is required to use active contexts or active threads in order to make the average number of cycles per a long latency subinstruction much shorter. This scheme requires more active contexts to mask the long latency subinstructions, but also allows more long latency subinstruction to be in progress at any given time.

In a general multithreaded architecture, a single active thread is employed for the running thread block. However, as shown in FIG. 3, the running thread block 2-1 according to the present invention includes a plurality n active threads.

Also, the VLIW processor has a feature that the context selection unit 3 packs n subinstructions from the n active threads into one instruction, which is in turn sent to the instruction processing unit 4 having functional units 4-1.

However, the present invention is not limited to the packing of subinstructions according to the VLIW processor. The present invention includes any combinations resulting from such superscalar-based scheme which finds independent instructions from the threads and then issues them simultaneously. Accordingly, it should be noted that instructions comprises any others, and VLIW is described herein as only an illustrative example, therefore the above enumerated schemes are all contemplated within the scope of the present invention.

In case of the occurrence of a long latency subinstruction in the functional units 4-1, the context relating to the long latency subinstruction is stored into the waiting thread block 2-2 and replaced with one of a thread from the ready thread block 2-3. So, active threads are rescheduled and a new subinstruction set from these active threads is packed into one new instruction group.

As described above, the packed one new instruction group includes a plurality of subinstructions therein. The probability of a individual long latency subinstruction is lower than that of a pack of long latency subinstruction in which one of the subinstructions is less than that of an instruction containing n subinstructions. Therefore, in the conventional art, if one of the subinstructions in an instruction causes a long latency, a pack of n multiple subinstructions has to be context-switched wholly and then an instruction packed from another thread is fetched, which requires more hardware and time switching for the contexts of the whole subinstructions which have to be stored.

This invention uses multiple program counters to solve these problems. In the multiple program counters scheme, each program counter traces a corresponding thread. Therefore, if a long latency subinstruction occurs, only that referred thread is context-switched and is substituted with subinstructions from another thread in the ready thread block, or ready queue. This allows the number of cycles necessary for context-switching to be reduced, and provides a performance enhancement of the functional units. It can be seen that only the context relating to the long latency subinstruction is context-switched, whereby the problems caused by the coupling of a VLIW or superscalar processor and a multiple threaded architecture can be overcome, i.e., the time taken for context switching overhead can be saved and reduced.

Figure 4:
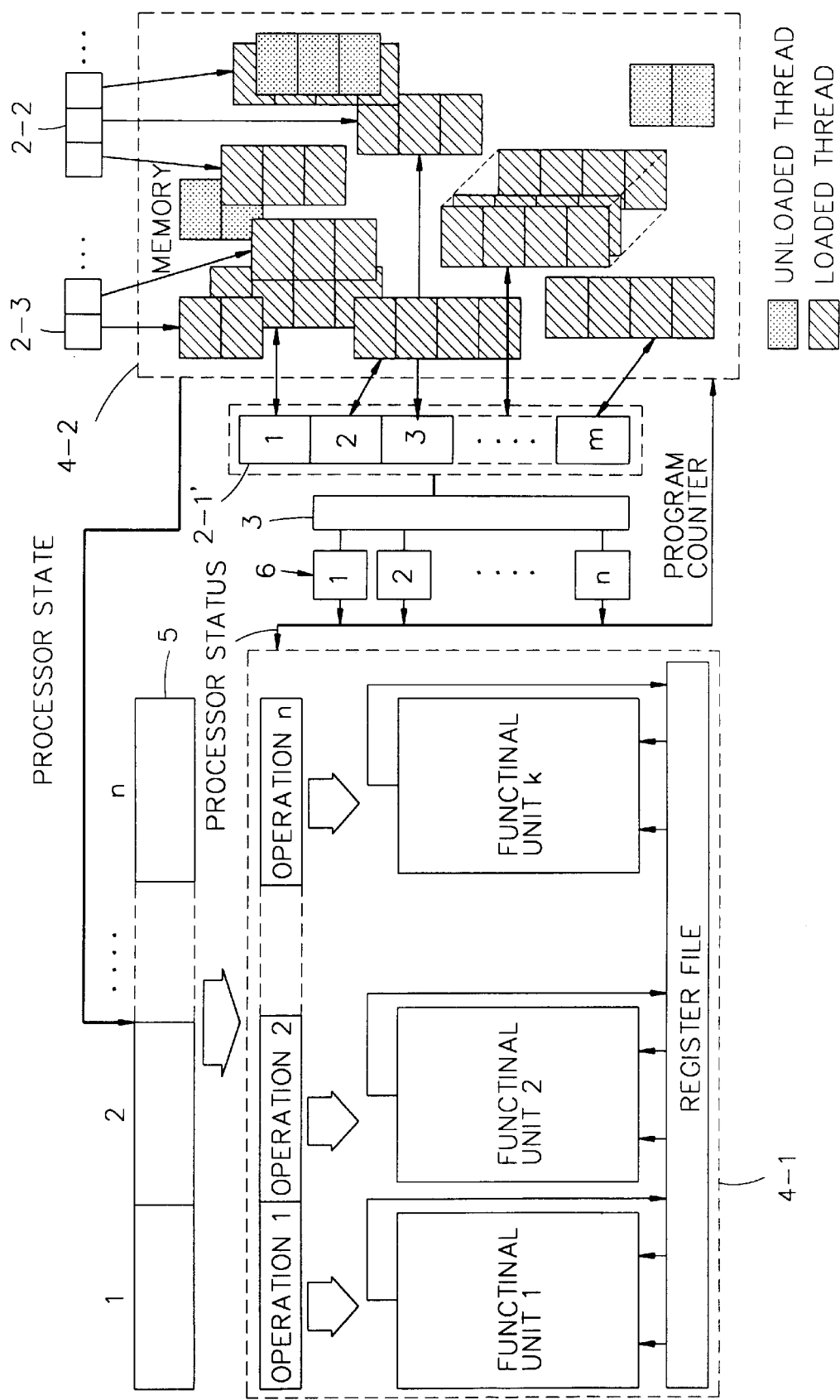
FIG. 4 is a block diagram illustrating a processor state according to a preferred embodiment of the present invention.

To realize such a scheme in accordance with the present invention, this invention uses multiple program counters as described earlier. Details thereof will be described below in reference to FIG. 4 showing a preferred embodiment of the present invention.

Software compiled to be executed by the processor becomes a thread. As shown in FIG. 4, a memory unit 4-2 contains many threads which are generated at compile time and are independent of each other. FIG. 4 shows the memory unit 4-2 having many threads loaded therein.

Subinstructions from plural active threads loaded in the memory unit 4-2 are packed as one instruction group which will be loaded in an instruction cache 5. The packing of subinstruction may be based on the inherent features of a VLIW processor, but is not limited thereto, as this invention comprises any other combinations of the subinstruction, as mentioned earlier. VLIW instructions reduce the number of instructions of a computer program thereby to provide an efficient program execution. This invention combines such an architecture with the multithreaded architecture.

The instruction cache 5 may be regarded as another memory device for reducing the access time to the main memory unit 4-2 and for thus providing fast execution of instructions. The instruction packing unit 5 which can be implemented within or independent of the instruction cache contains a plurality of subinstructions which will be processed by the functional units 4-1.

Each instruction group having a plurality of subinstructions is aligned with those multiple threads by means of the multiple program counters which point to the running threads. The function of the program counters will be described later.

The architecture according to the present invention contains m register frame 2-1' implemented as the running thread block 2-1 in FIG. 3. As shown in FIG. 4, the m register frames 2-1' are arranged to communicate with the active thread loaded in the memory unit 4-2, and also with the context selection unit 3. Each register frame contains the hardware context of the related thread such as program counters 6 and processor status.

These multiple program counters trace the contexts and contribute to the performance enhancement by the elimination of switching overhead.

Figure 5:
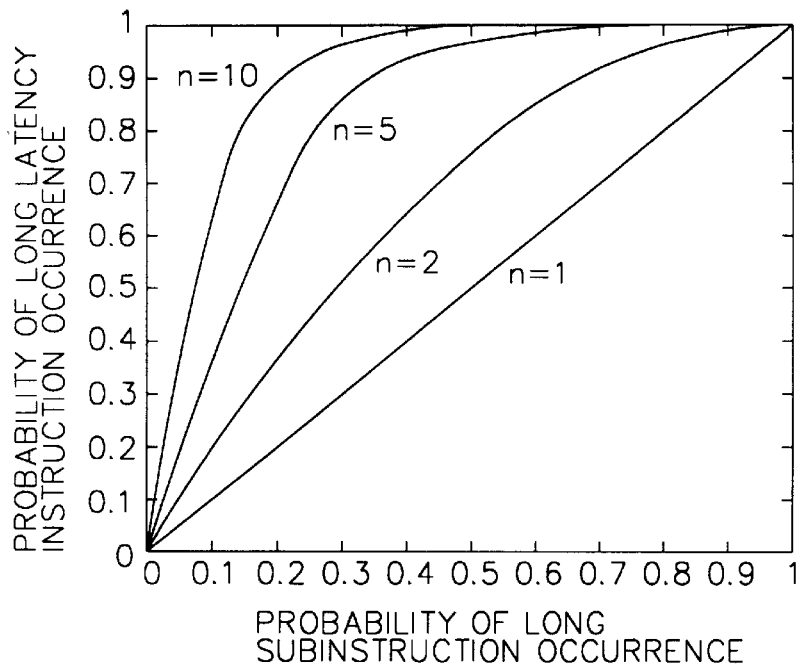
FIG. 5 is a graph illustrating the relation between long latency subinstructions occurrence with regard to the number of subinstructions and the entire occurrence.
Figure 6:
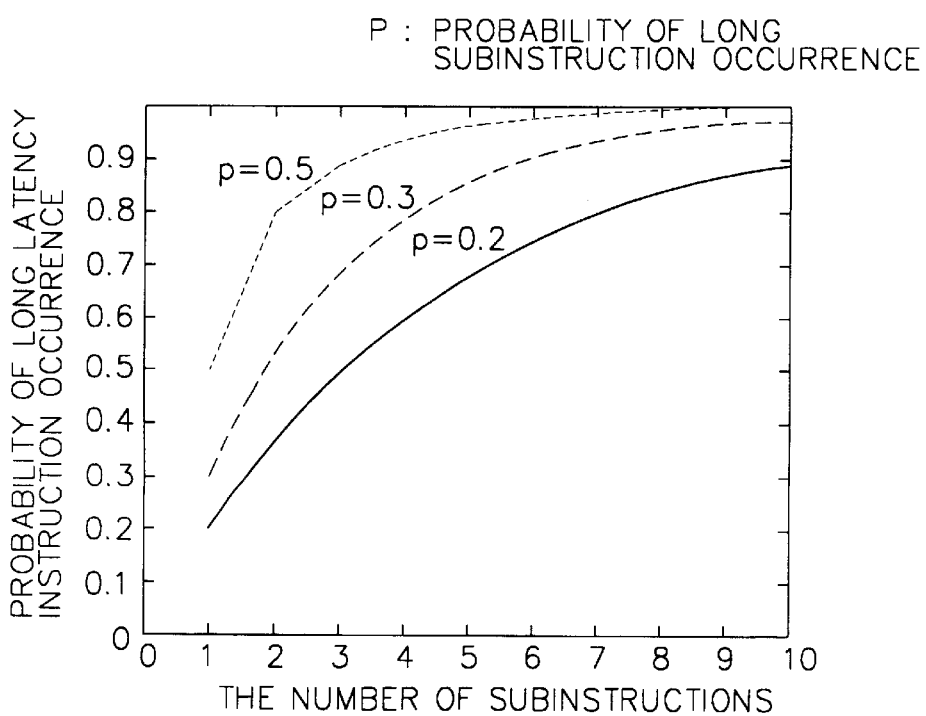
FIG. 6 is a graph illustrating the relation between long latency subinstructions occurrence with regard to the number of subinstructions in FIG. 5 and entire occurrence.

When a single program counter is used as in the conventional art, even if one of the subinstructions in an instruction causes a long latency, a pack of n multiple subinstruction has to be switched. This is very inefficient, because it takes more hardware and time for the contexts of all the subinstructions to be stored. Moreover, a possibility of the long latency subinstruction increases. FIG. 5 shows that even though the long latency probability of each subinstruction is 0.3, in case of five substrictions as compared with one subinstruction, the probability of the long latency subinstruction occurrence within a new instruction group for n=5 increases to 0.85. FIG. 6 shows the probability of a long latency subinstruction occurrence with the fixed probability of a single long latency subinstruction occurrence. This implies that most of the time of the processor is consumed for context-switching not for processing. This problem is solved by using multiple program counters in accordance with the present invention.

In the multiple program counters scheme according to the present invention, each program counter traces the context associated with the corresponding thread. As mentioned above, if a long latency subinstruction occurs in the functional units 4-1, only that referred thread is context-switched by means of the program counter tracing the thread containing such long latency subinstruction, and the corresponding program counter refers to another new ready thread. More specifically, the thread which causes such a long latency is at first dequeued from the register frame 2-1', and then registered in the waiting (or suspended) thread block 2-3. Subsequently, a thread from the ready thread block 2-3 is allocated into the register frame 2-1', the allocated new thread being traced by the corresponding program counter.

At this time, the active threads are rescheduled, a new subinstruction set from these active threads is packed into one new instruction, and the new instruction is then loaded in the instruction packing unit 5 again. It is noted that respective active threads are traced by respective program counters. Such procedures are repeated.

In this scheme, the probability of the long latency subinstruction is no more a function of the number of subinstructions in a pack instruction group. Moreover, since only the context of the long latency subinstruction is switched by using a program counter having traced the thread containing the long latency subinstruction, the context-switching time and the context-switching overhead can be reduced.

Generally, the computer system architecture tends to seek to reduce or hide the latency, the number of cycles the subinstruction takes from start to finish, forcing the conventional processor to sit idle until the required sources are available. Especially in the area of multimedia applications, less time is wasted if the latency is reduced or even hidden during the ongoing execution of another subinstruction. The threads are interleaved on a single processor. When a long latency subinstruction occurs, useful work is performed while the time-consuming processing is completed. The present invention merges the VLIW architecture and the multithreaded architecture to gain more enhanced performance and the long latency subinstruction caused by such merging is effectively processed by the present invention.

It should be noted that the present invention as such can also be applied to the superscalar-based processor. Namely, the n number of instructions in the VLIW processor is equivalent to n-way pipelining in the superscalar processor.

According to the foregoing, only subinstruction causing long latency need be context-switched by multiple program counters, and thereby the execution of instructions is made effectively. This scheme can be applied in any fields requiring the context switching procedure, with modifications, changes, and alterations thereof within the scope of the present invention.

What is claimed is:

1. A method for processing instructions in a data processing system having an active thread block, a ready thread block, and a waiting thread block, and an instruction execution block, so as to contemporaneously process a plurality of active threads, the method comprising:

combining instructions issued from plural active threads into one new instruction group, each active thread having a plurality of instructions, and the issued instructions being used as subinstructions in the combined one instruction group;

processing the combined one new instruction by the instruction execution block, and tracing contexts relating to active threads which provide the respective subinstructions by using multiple program counters; and context-switching only the context of a thread among the active threads which provides a long latency subinstruction among the subinstructions to be executed, the context switching being performed by the program counter tracing said context and comprising moving a thread having a long latency subinstruction to the waiting thread block, followed by the replacement of the long latency subinstruction by an instruction from another thread in the ready thread block into said combined instruction group to be processed by the instruction execution block.

2. The method as claimed in claim 1, where the context comprises contents of the program counter and a processor status, and wherein the data processing system comprises a separate memory unit for storing the threads.

3. The method as claimed in claim 2, wherein the thread to be context-switched is moved to the wafting thread block by way of the separate memory unit.

4. The method as claimed in claim 1, further comprising the step of loading the combined instructions to an instruction cache to which the instruction execution block can refer.

5. The method as claimed in claim 1, wherein the instruction execution block comprises a plurality of functional units and a plurality of registers operatively coupled to the plurality of functional units.

6. A data processing system for contemporaneously processing a plurality of threads, and having an active thread block, a ready block and a waiting thread block, and an instruction execution block, the system comprising:

first memory means for loading a plurality of active threads therein;

instruction combining means for combining instructions issued from plural active threads into one new instruction, each active thread having a plurality of instructions, and the issued instructions being used as subinstructions in the combined one instruction group;

a plurality of program counters for tracing contexts corresponding to each of the plural active threads which provide the respective subinstructions to the combined instruction block, the context comprising contents of the program counters and a processor status;

second memory means for storing the threads, context-switching means for context switching the context of a thread providing a long latency subinstruction among the subinstructions to be executed, the context switching means identifying the context to be switched from the corresponding program counter tracing said context, the context-switching means moving the thread providing the long latency subinstruction to the waiting thread block; and means for selecting an instruction from another thread in the ready thread block to replace the long latency subinstruction in the instruction group to be processed by the instruction execution block.

7. The system as claimed in claim 6, further comprising an instruction cache for loading the combined new instructions, wherein the instruction execution block refers the instruction cache for instructions to be executed.

8. The system as claimed in claim 6, wherein the instruction execution block comprises a plurality of functional units, and a plurality registers operatively coupled to the plurality of functional units.

* * * * *